United States Patent
Looper

(10) Patent No.: US 12,262,099 B1
(45) Date of Patent: Mar. 25, 2025

(54) SYSTEMS AND METHODS FOR CLIENT-CONTROLLED ADAPTIVE STREAMING OF THREE-DIMENSIONAL CONTENT

(71) Applicant: Illuscio, Inc., Culver City, CA (US)

(72) Inventor: Sean Looper, Flagstaff, AZ (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/950,507

(22) Filed: Nov. 18, 2024

(51) Int. Cl.
*H04N 21/81* (2011.01)
*G06T 17/10* (2006.01)

(52) U.S. Cl.
CPC .......... *H04N 21/816* (2013.01); *G06T 17/10* (2013.01)

(58) Field of Classification Search
CPC .............................. H04N 21/816; G06T 17/10
USPC .......................................................... 348/51
See application file for complete search history.

(56) References Cited

U.S. PATENT DOCUMENTS

| 12,198,244 B1 * | 1/2025 | Kinkade | H04N 21/816 |
| 2021/0092444 A1 * | 3/2021 | Ilola | H04N 21/816 |
| 2022/0239949 A1 * | 7/2022 | Hannuksela | H04N 21/2353 |
| 2023/0370666 A1 * | 11/2023 | Dawkins | H04N 21/21805 |
| 2024/0104824 A1 * | 3/2024 | Gupta | G06T 15/06 |

OTHER PUBLICATIONS

Limper, M., Jung, Y., Behr, J. and Alexa, M. (2013), The POP Buffer: Rapid Progressive Clustering by Geometry Quantization. Computer Graphics Forum, 32: 197-206. https://doi.org/10.1111/cgf.12227 (Year: 2013).*

* cited by examiner

*Primary Examiner* — Thai Q Tran
*Assistant Examiner* — Stephen R Smith
(74) *Attorney, Agent, or Firm* — Ansari Katiraei LLP; Arman Katiraei; Sadiq Ansari

(57) ABSTRACT

A three-dimensional (3D) streaming system provides client-controlled adaptive streaming of 3D content in which the client may receive the 3D primitives of 3D content at different fidelities that the client selects. The system includes generating a 3D model at different fidelities, partitioning the 3D model into different volumetric spatial units, generating a manifest with an index for each volumetric spatial unit and an identifier for each fidelity, and presenting the 3D primitives in a first set of volumetric spatial units at a first fidelity and the 3D primitives in a second set of volumetric spatial units at a second fidelity in response to a request that includes indices of the first set of volumetric spatial units with a first identifier for the first fidelity and indices of the second set of volumetric spatial units with a second identifier for the second fidelity.

20 Claims, 9 Drawing Sheets

SYSTEMS AND METHODS FOR CLIENT-CONTROLLED ADAPTIVE STREAMING OF THREE-DIMENSIONAL CONTENT

BACKGROUND

Adaptive streaming protocols and techniques exists for the transmission of two-dimensional (2D) content or three-dimensional (3D) content that is converted to 2D content before it is streamed to a receiving client. The adaptive streaming protocols and techniques allow for the 2D content to be sent at different resolutions depending on the network conditions and/or available resources of the receiving client. Specifically, adaptive streaming of 2D content allows for all pixels of a first 2D frame or 2D image to be streamed at a first resolution and all pixels of a second 2D frame or 2D image to be stream at a different second resolution.

Virtual reality, mixed reality, augmented reality, and other enhanced reality or spatial computing experiences as well as improvements to network capacity and client resources have created a need for native 3D content streaming. In other words, there is a need to stream the original 3D primitives that form the 3D shapes and structures in 3D mesh models, point clouds, Gaussian splat 3D representations, and/or other 3D formats without first converting these 3D primitives or 3D formats to a 2D format or 2D image. The adaptive streaming protocols and techniques for 2D content do not apply and cannot be used to optimize the network delivery of the 3D primitive. Moreover, the 3D primitives of a 3D model are typically encoded with exponentially more data than a 2D image. As such, there is need for adaptive streaming protocols and techniques that apply and optimize the streaming of native 3D primitives or content over a data network.

DETAILED DESCRIPTION OF PREFERRED EMBODIMENTS

Figure 1:
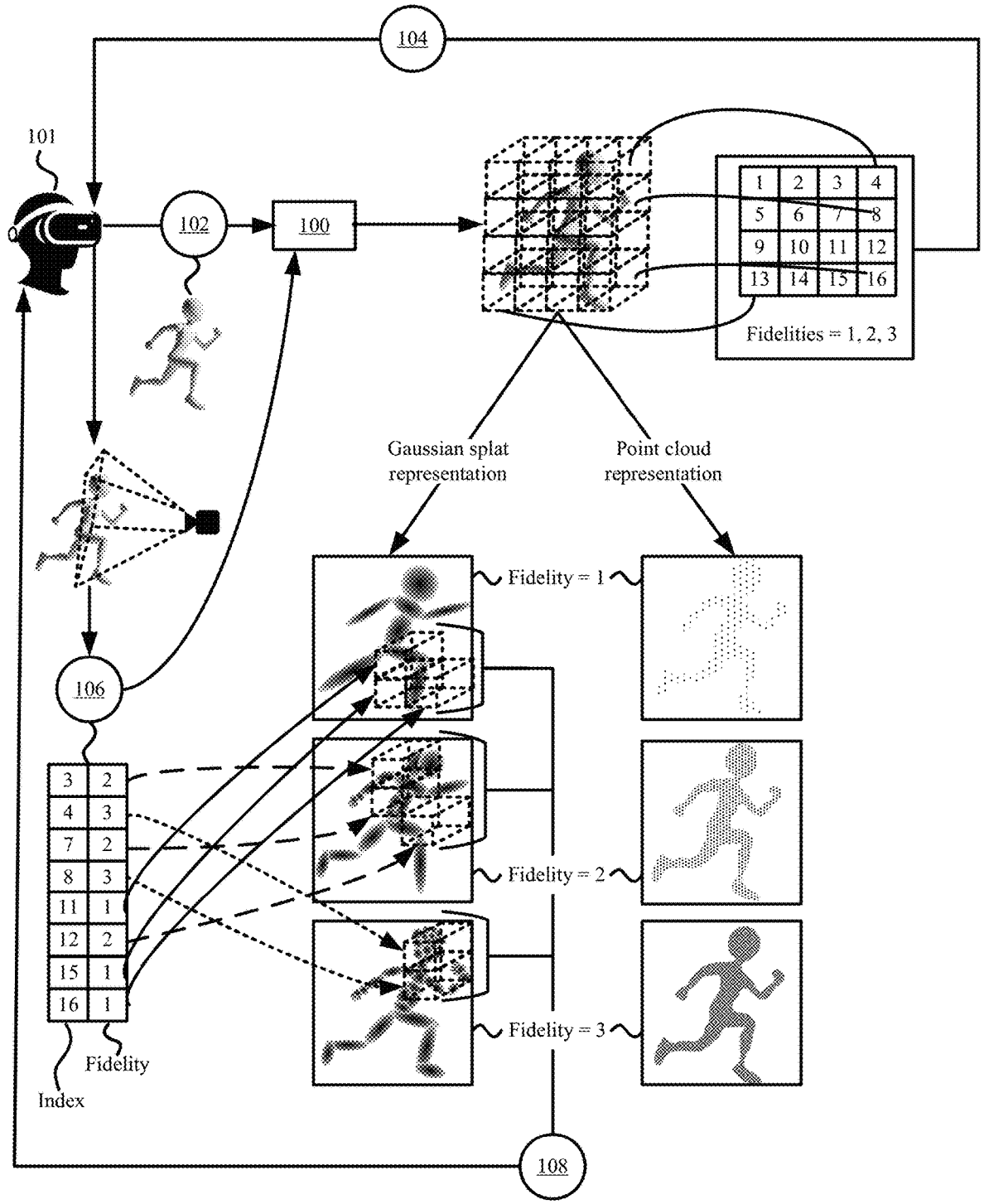
FIG. 1 illustrates an example of a client-controlled adaptive streaming of three-dimensional (3D) content in accordance with some embodiments presented herein.

The following detailed description refers to the accompanying drawings. The same reference numbers in different drawings may identify the same or similar elements.

Provided are systems and methods for client-controlled adaptive streaming of three-dimensional (3D) content. The client-controlled adaptive streaming includes streaming the 3D primitives of different 3D formats for a single scene or frame of static, dynamic, or animated 3D content at different fidelities that the client selects. Accordingly, the client-controlled adaptive streaming applies to meshes or polygons of a 3D mesh model, points of a point cloud, Gaussian splats of a 3D Gaussian splat representation, and/or other 3D primitives used to construct different 3D models.

The client-controlled adaptive streaming includes a server-side partitioning of the 3D space in which the 3D content is defined. The partitioning subdivides the 3D space into volumetric spatial units. A volumetric spatial unit is a non-overlapping subdivided region of the 3D space in which a subset of 3D primitives of the 3D content may be defined or positioned. Each volumetric spatial unit is assigned an index.

The client-controlled adaptive streaming includes generating a manifest that associates the index of each volumetric spatial unit to the different fidelities at which the 3D primitives in that volumetric spatial unit may be accessed. For instance, a lowest fidelity representation for a volumetric spatial unit includes a base or minimum set of 3D primitives for representing the part of the 3D content in the corresponding region of 3D space represented by the volumetric spatial unit at a low level-of-detail or low visual quality. Increasing fidelities increase the number of 3D primitives, shrink the size of the 3D primitives for added detail, and/or increase density of the 3D primitives for representing the part of the 3D content in the corresponding region of 3D space represented by the volumetric spatial unit with more detail and/or better visual quality. In some embodiments, the 3D primitives of the 3D content may be associated with one of the different fidelities.

The client receives the manifest in response to submitting a request for the 3D content to the server from which the 3D content is accessible. The client may request different volumetric spatial units that are listed in the manifest at different fidelities depending on the available device and network resources as well as which part of the 3D content receives the user focus. For instance, the client may request a first set of volumetric spatial units at the highest fidelity in response to the first set of volumetric spatial units corresponding to 3D content regions in the foreground and at the center of a current field-of-view or 3D content regions where the user is looking. The client may request volumetric spatial units that are more and more distant from the first set of volumetric spatial units at progressively lower fidelities to preserve network bandwidth and reduce the rendering load on the client while preserving visual quality on the user focused regions.

FIG. 1 illustrates an example of the client-controlled adaptive streaming of 3D content in accordance with some embodiments presented herein. 3D streaming system 100 includes one or more devices or machines for hosting and/or streaming various 3D content across a data network to requesting clients. Accordingly, 3D streaming system 100 may include a 3D game streaming service, a 3D video streaming service, a 3D spatial computing experience service (e.g., virtual reality, mixed reality, augmented reality, or other enhanced reality service provider), and/or other distributor of 3D content.

Client 101 submits (at 102) a request for 3D content to 3D streaming system 100. The request may include a HyperText Transfer Protocol (HTTP) GET message or another request specified using a different network protocol or request type. The request may be directed to a Uniform Resource Locator (URL) that includes the path and name for the requested 3D content.

3D streaming system 100 replies to the request by forwarding (at 104) the manifest that is generated for the 3D content to client 101. The manifest includes the indices for the different volumetric spatial units that partition the 3D space of the 3D content and the different fidelities at which each volumetric spatial unit may be accessed, requested, and/or rendered.

Client 101 selectively requests (at 106) different volumetric spatial units at different fidelities based on available network and/or rendering resources and a prioritization of the field-of-view from which the 3D content is presented. The initial field-of-view may be defined from a default placement and orientation of a virtual camera in the 3D space of the 3D content or from a last tracked placement and orientation of the virtual camera. In other words, whenever the 3D content is first requested by any client device, the 3D content may be presented from the same initial field-of-view and the user may then freely move within the 3D space (e.g., change the position and orientation of the virtual camera) to change the field-of-view and/or presentation of the 3D content.

In some embodiments, selectively requesting (at 106) the different volumetric spatial units may include requesting a higher fidelity for the volumetric spatial units at the center and/or foreground of the current field-of-view and requesting volumetric spatial units that are further removed from the center and the foreground at progressively lower and lower fidelities. In some embodiments, selectively requesting (at 106) the different volumetric spatial units may include requesting a higher fidelity for the volumetric spatial units that receive user focus and requesting volumetric spatial units that are further removed from the user focus at progressively lower and lower fidelities. In some embodiments, selectively requesting (at 106) the different volumetric spatial units may include requesting all volumetric spatial units within the initial field-of-view at the lowest fidelity, monitoring resource availability, and then increasing fidelity for the volumetric spatial units at the center, in the foreground, and/or that receive the user focus if there are excess resources.

3D streaming system 100 streams (at 108) the 3D primitives that are encoded in the requested (at 106) volumetric spatial units at the specified fidelity. Accordingly, the 3D primitives for volumetric spatial units requested at a higher fidelity may be streamed at a higher level-of-detail, with a greater density of 3D primitives, and/or with a greater number of smaller sized 3D primitive than volumetric spatial units requested at a lower fidelity.

Client 101 may track changes to the current field-of-view. The changes to the field-of-view may be in response to user input. In some embodiments, the user input may include a controller input for changing the field-of-view. The controller input may change the position of a virtual camera or a playable character in the 3D space. In some embodiments, the user input may include input that tracks the user focus. For instance, eye tracking sensors may track the user gaze and may change the field-of-view according to the tracked user gaze. Motion sensors may also track the user focus. For instance, sensors that track movement of a headset, the user body, or a device carried by the user may be used to change the field-of-view.

Client 101 may selectively request different volumetric spatial units at different fidelities in response to the tracked changes to the field-of-view. For instance, the volumetric spatial units that move from the background to the foreground, from the field-of-view periphery to the center, or into the user focus may be requested at increased fidelity and the volumetric spatial units that move from the foreground to the background, from the center to the periphery, or out of the user focus may be requested at decreased fidelity or may be retained at the current fidelity to avoid redundant streaming of 3D primitives.

Figure 2:
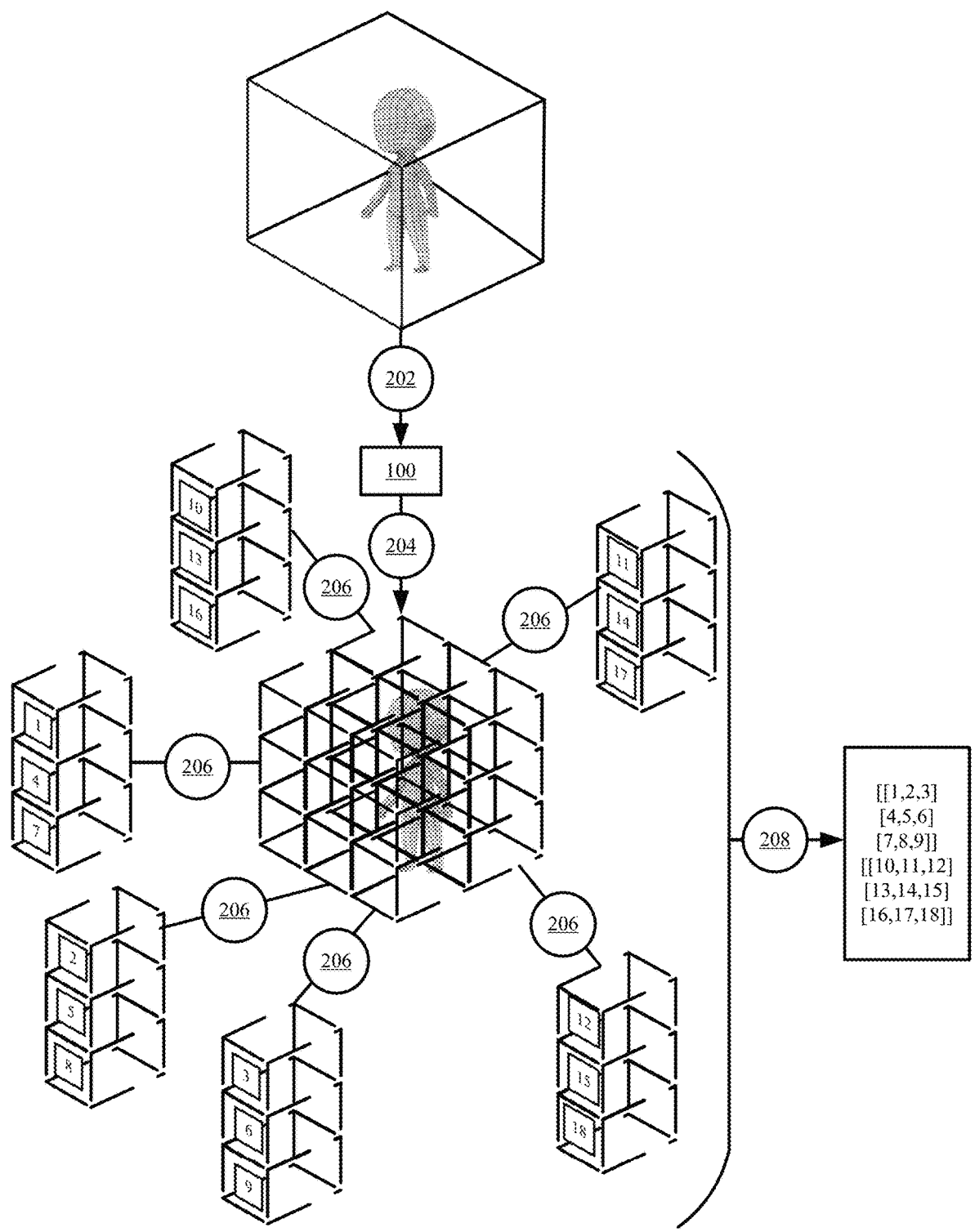
FIG. 2 illustrates an example of the volumetric spatial units that are generated for the client-controlled adaptive streaming in accordance with some embodiments presented herein.

FIG. 2 illustrates an example of the volumetric spatial units that are generated for the client-controlled adaptive streaming in accordance with some embodiments presented herein. 3D streaming system 100 receives (at 202) 3D content. The 3D content may be defined with meshes or polygons of a 3D mesh model, points of a point cloud, Gaussian splats for a Gaussian splat representation, and/or 3D primitives of another 3D format.

3D streaming system 100 divides (at 204) the 3D space in which the 3D content is defined into smaller volumetric spatial units. In some embodiments, each volumetric spatial unit may be the same size and/or span a similar volume of the 3D space in a non-overlapping manner. In some other embodiments, the volumetric spatial units may be defined to span a non-uniformly sized region of the 3D space so that an equal number of 3D primitives is contained within each of the volumetric spatial units.

3D streaming system 100 assigns (at 206) a unique index to each volumetric spatial unit. The index for a volumetric spatial unit may be a numerical value or coordinate that maps to the region or volume of 3D space spanned by that volumetric spatial unit.

3D streaming system 100 enters (at 208) the indices into the 3D content manifest. In some embodiments, the indices are arranged or positioned in the content manifest to directly map to the regions or volume of 3D space represented by the volumetric spatial unit identified by an index. For instance, the manifest may include the dimensions or size of each volumetric spatial unit and the indices are arranged to map volumetric spatial units of the defined size in the 3D space of the 3D content. Since volumetric spatial units may be defined at different depths, the manifest may arrange the indices as multi-dimensional matrix with each dimension of the matrix corresponding to volumetric spatial units at a different depth in the 3D space. In some embodiments, each index may directly map to a volumetric spatial unit by defining the index with 8 coordinates for the corners of the volumetric spatial unit. In some other embodiments, the manifest includes a table that maps each index to the coordinates the volumetric spatial unit identified by that index.

Figure 3:
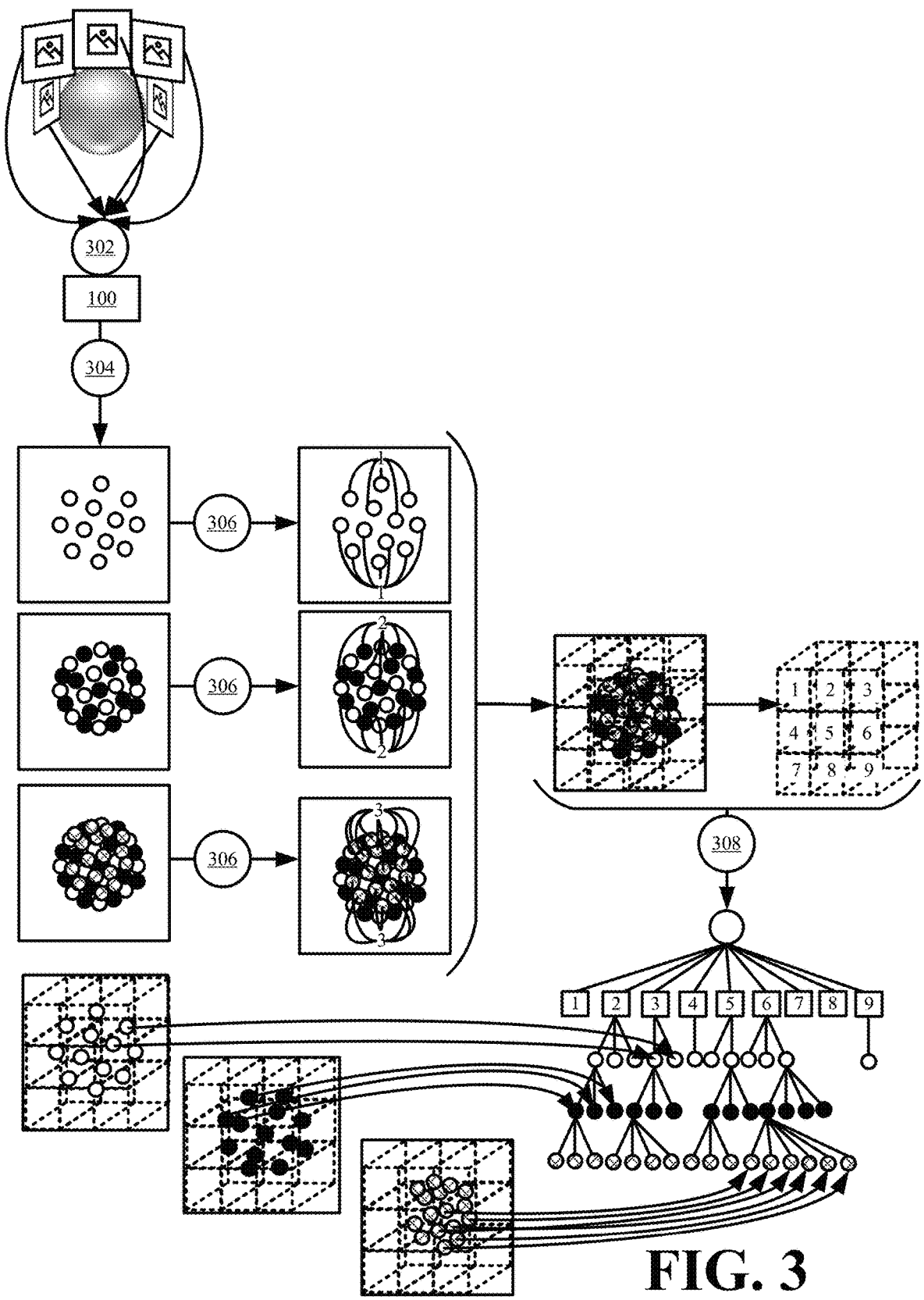
FIG. 3 illustrates an example of generating 3D content at different fidelities in accordance with some embodiments presented herein.

3D streaming system 100 may encode the 3D content at different fidelities and may generate the manifest by associating the 3D primitives for the different fidelities at which the 3D content is encoded to the indices of the volumetric spatial units in which the 3D primitives are located or positioned. FIG. 3 illustrates an example of generating 3D content at different fidelities in accordance with some embodiments presented herein.

3D streaming system 100 may receive (at 302) input data for generating a 3D model. The input data may include 2D images that capture an object or scene from different perspectives, angles, and/or positions. The input data may include 3D scan data that is combined with visual data from a 2D image. For instance, a Light Detection and Ranging (LiDAR) or other 3D scanner may be used to obtain 3D positional data for different scanned points from an object or scene and the 2D image may capture the colors at the scanned points.

3D streaming system 100 may generate (at 304) the 3D content at different fidelities from the input data. In some embodiments, 3D streaming system 100 uses a radiance field or neural network to generate Gaussian splats, points, or other 3D primitives based on the input data. In some such embodiments, 3D streaming system 100 generates the 3D model at the different fidelities in multiple iterative passes with each iterative pass adding more 3D primitives to increase the density and detail at which the 3D model is represented and with the 3D primitives generated in each pass corresponding to a different fidelity representation of the 3D model. For instance, 3D streaming system 100 may configure a Gaussian splatting engine with a first amount of acceptable loss for the loss function (e.g., 20% loss), and the Gaussian splatting engine may generate a first set of splats that represent a 3D model of the object or scene in the input data at a first fidelity corresponding to the first amount of acceptable loss. 3D streaming system 100 may then configure the loss function with a lower second amount of acceptable loss (e.g., 10% loss), and the Gaussian splatting engine may generate a second set of splats that represent the 3D model of the object or scene in the input data at a second fidelity corresponding to the second amount of acceptable loss. Specifically, the second set of splats may be added to the first set of splats to increase the fidelity (e.g., quality and detail) at which the 3D model is rendered. 3D streaming system 100 may continue decreasing the amount of acceptable loss at which the Gaussian splatting engine generates the 3D model, and may associate the newly generated or added splats to an increasing fidelity value.

In some embodiments, 3D streaming system 100 generates (at 304) points based on the input data to represent the 3D model at the different fidelities. In some such embodiments, 3D streaming system 100 may use photogrammetry or the 3D scan data to generate points at positions in 3D space and may assign color values to the points based on colors from pixels of a 2D image that align with the generated points. 3D streaming system 100 may select a first set of the generated points (e.g., every $3^{rd}$ point) to represent the 3D model at a lowest first level-of-detail, may select a second set of the generated points that added to the first set of the generated points represent the 3D model at a next higher second level-of-detail, and may select a third set of the generated that added to the first and second sets of generated points represent the 3D model at a highest third level-of-detail.

To maintain the association between the 3D primitives and the different fidelities, 3D streaming system 100 tags or otherwise associates (at 306) the different fidelity values to the different 3D primitives associated with the different fidelities represented by the different fidelity values. For instance, each 3D primitive defined with a fidelity value of 1 may be used to render the 3D content at a lowest first level-of-detail. Each 3D primitive defined with a fidelity value of 2 may be rendered with the 3D primitives defined with the fidelity value of 1 to render the 3D content at a next higher second level-of-detail.

3D streaming system 100 generates (at 308) a hierarchical representation for the 3D model at the different fidelities. The hierarchical representation may include an octree, binary tree, K-dimensional tree, or other tree structure for identifying and accessing the 3D primitives that are associated with each fidelity. For instance, the grandparent nodes of the tree may represent the 3D primitives at a lower first fidelity, the parent nodes of the tree combined with the grandparent nodes may represent the 3D primitives at a higher second fidelity, and the leaf nodes of the tree combined with the nodes at the higher levels may represent the 3D primitives at the highest third fidelity. The nodes at each layer or the 3D primitives associated with each fidelity may be arranged in the tree based on the partitioning of the 3D content space into the volumetric spatial unit. In other words, each branch of the hierarchical representation may correspond to a different volumetric spatial unit, and the 3D primitives linked to that branch may be accessed using the index of the corresponding volumetric spatial unit and the desired fidelity.

In this structure, the 3D primitives associated with each lower level node may be combined or rendered with the 3D primitives associated with nodes at a higher level in the tree to generate the 3D model at the different fidelities. In other words, the 3D primitives associated with the lower levels of the tree add or increase detail to the 3D model representation created by the 3D primitives associated with the higher levels of the tree. Accordingly, if a client requests the 3D model at a lowest first fidelity, 3D streaming system 100 accesses the grandparent layer and streams the 3D primitives associated with the nodes at the grandparent layer. If the client then requests the 3D model at the middle second fidelity and 3D streaming system 100 has already streamed the 3D primitives for the lowest first fidelity, 3D streaming system 100 may access the parent layer and stream the 3D primitives associated with the nodes at the parent layer without having to resend the 3D primitives for the lowest first fidelity.

In some embodiments, 3D streaming system 100 generates discrete 3D models to represent the 3D content at different fidelities. For instance, 3D streaming system 100 may generate a first number of larger-sized meshes to represent the 3D content at a low first fidelity and may generate a second greater number of smaller-sized meshes to represent the 3D content at a high second fidelity. In some such embodiments, there is no benefit in combining the first number of larger-sized meshes with the second greater number of smaller-sized meshes as the second greater number of smaller-sized meshes replace rather than add to the first number of larger-sized meshes.

3D streaming system 100 generates the manifest to list the different fidelities at which each of the volumetric spatial units for the entire 3D space of the 3D content may be requested. The manifest includes the index assigned to each volumetric spatial unit, the different fidelities for each index at which the 3D primitives in each volumetric spatial unit may be accessed, and an implicit or explicit mapping between the indices and the regions of 3D space spanned by those indices. 3D streaming system 100 provides the manifest to a client that requests the 3D content, and the client, by referencing the manifest, may request and receive different volumetric spatial units of the 3D content at different fidelities so that the quality of the 3D content may be maximized despite changing or limited network and/or rendering resources.

Figure 4:
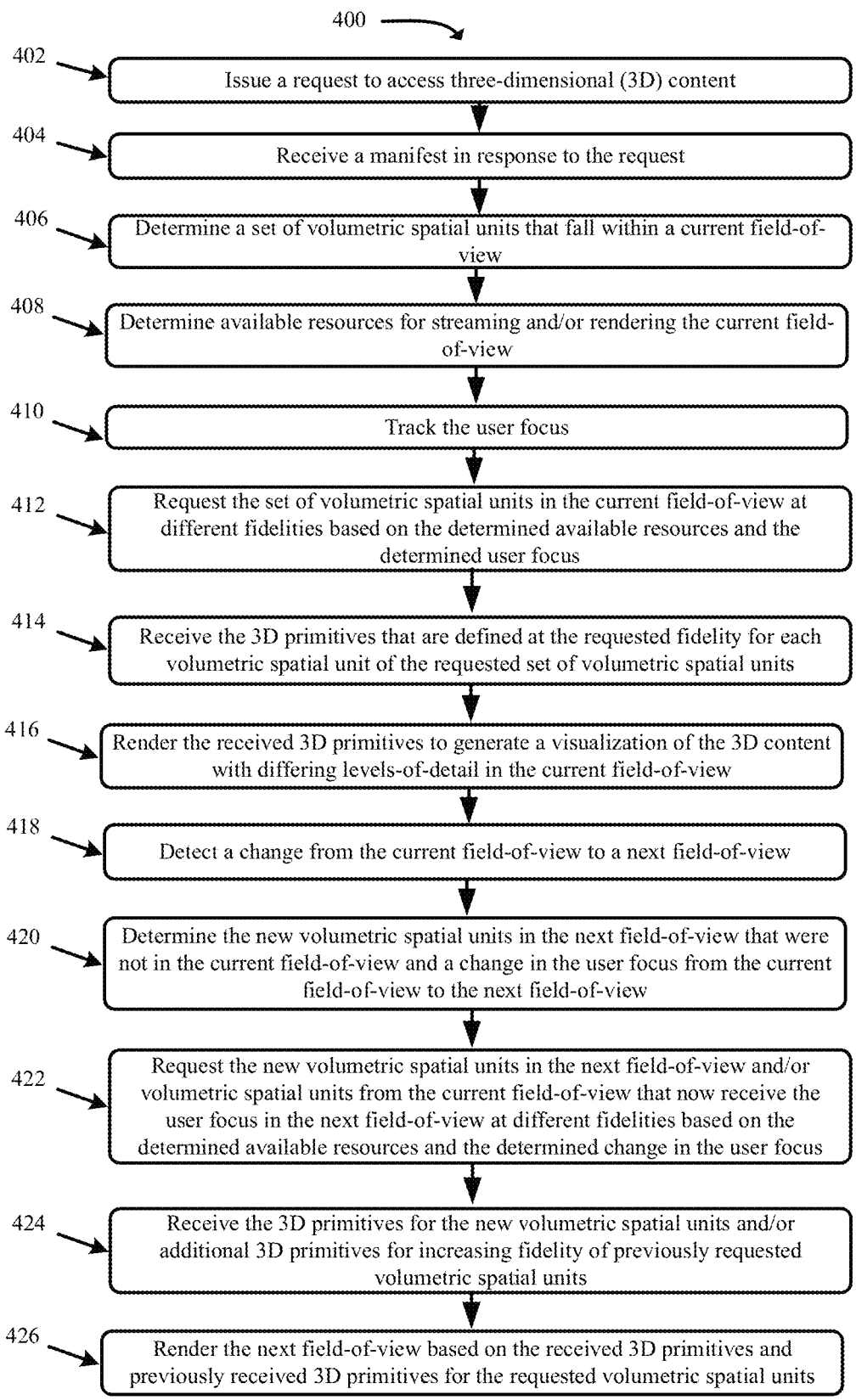
FIG. 4 presents a process for the client-controlled adaptive streaming of 3D content in accordance with some embodiments presented herein.

FIG. 4 presents a process 400 for the client-controlled adaptive streaming of 3D content in accordance with some embodiments presented herein. Process 400 is implemented by a client device (e.g., client 101). The client device may include processing, memory, storage, network, and/or other hardware resources for remotely accessing and rendering 3D content. The client device may correspond to a spatial computing device (e.g., a headset or wearable device), a gaming appliance, and/or other network-enabled computing devices.

Process 400 includes issuing (at 402) a request to access 3D content, and receiving (at 404) a manifest in response to the request. The manifest contains indices for different volumetric spatial units that partition the 3D space of the 3D content and different fidelities at which the volumetric spatial units may be rendered. In some embodiments, the manifest specifies an amount of data for each volumetric spatial unit at each fidelity. For instance, 3D streaming system 100 sums the data associated with each 3D primitive in the volumetric spatial unit at each fidelity and includes the sum in association with the index for that volumetric spatial unit and the fidelity. In some embodiments, the manifest includes a mapping between each index and the region of 3D space spanned by the volumetric spatial unit represented by that index.

Process 400 includes determining (at 406) a set of volumetric spatial units that fall within a current field-of-view. The determination (at 406) may be based on the mapping between the manifest indices and the regions of 3D space spanned by the volumetric spatial units represented by those indices. The current field-of-view may initially correspond to a default starting field-of-view (e.g., a default position and orientation for a virtual camera in the 3D space of the 3D content). The default starting field-of-view may change in response to user input or user movements within the 3D space of the 3D content.

Process 400 includes determining (at 408) available resources for streaming and/or rendering the current field-of-view. The client device may determine (at 408) the available network resources by testing network performance to determine the bandwidth and/or latency associated with sending and receiving data from 3D streaming system 100 (e.g., issuing (at 402) the request and receiving (at 404) the manifest). The client device may determine (at 408) the available streaming and/or rendering resources based on the fidelity at which the volumetric spatial units for a last field-of-view were received and the buffer between the last field-of-view and the current field-of-view. For instance, if the client device received the last field-of-view at the lowest fidelity with some amount of time remaining before having to render the current field-of-view, the client device may determine that additional resources remain with which to request one or more of the volumetric spatial computing units at a higher fidelity.

Process 400 includes tracking (at 410) the user focus. In some embodiments, the client device tracks the user focus using eye tracking sensors, head or body movement sensors, controller input, and/or other sensors or user inputs. In some embodiments, the client device tracks the user focus according to the positioning of the set of volumetric spatial units within the current field-of-view or prioritization values associated with the set of volumetric spatial units. For instance, the user focus may be defined or fixed at the center and/or foreground of the current field-of-view. Alternatively, 3D streaming system 100 may set the prioritization values based on 3D primitives of objects-of-interest that are positioned within one or more of the volumetric spatial units and may add the prioritization values to the indices of the one or more volumetric spatial units in the manifest.

Process 400 includes requesting (at 412) the set of volumetric spatial units in the current field-of-view at different fidelities based on the determined (at 408) available resources and the determined (at 410) user focus. The client device may issue a single request that includes the indices for the set of volumetric spatial units and a fidelity value associated each index that corresponds to the fidelity requested for the volumetric spatial unit associated with the index.

If the available resources support receiving the set of volumetric spatial units at the highest fidelity, then the client device requests (at 412) the set of volumetric spatial units at the highest fidelity. If the available resources cannot support receiving the set of volumetric spatial units at the highest fidelity, then the client device requests (at 412) the set of volumetric spatial units to preserve the highest fidelity for the volumetric spatial units that receive the user focus and to reduce the fidelity for the volumetric spatial units that are further and further away from the volumetric spatial units that receive the user focus until the total data for requested (at 412) set of volumetric spatial units is within the determined (at 408) resources.

In some embodiments, the client device may request the set of volumetric spatial units for the current field-of-view at the lowest fidelity. If there are sufficient available resources remaining with which to render the current field-of-view, the client device may request the 3D primitives at the next higher fidelity for the volumetric spatial units of the current field-of-view that receive the user focus, and may add the 3D primitives at the next higher fidelity to the 3D primitives at the lowest fidelity to progressively increase the fidelity of the 3D content within the time window for the current field-of-view.

Process 400 includes receiving (at 414) the 3D primitives (e.g., meshes, points, Gaussian splats, etc.) that are defined at the requested fidelity for each volumetric spatial unit of the requested (at 412) set of volumetric spatial units. Process 400 includes rendering (at 416) the received (at 414) 3D primitives to generate a visualization of the 3D content with differing levels-of-detail and/or detail in the current field-of-view.

Process 400 includes detecting (at 418) a change from the current field-of-view to a next field-of-view. For instance, a user provides input that changes the position or perspective at which the 3D content is viewed. The next field-of-view may include one or more volumetric spatial units that were not in the current field-of-view, may move one or more volumetric spatial units from the current field-of-view out of the next field-of-view, and/or may reposition some volumetric spatial units from the current field-of-view in the next field-of-view (e.g., move from background to foreground, from periphery to the center, etc.).

Process 400 includes determining (at 420) the new volumetric spatial units in the next field-of-view that were not in the current field-of-view and a change in the user focus from the current field-of-view to the next field-of-view. The determination (at 420) of the new volumetric spatial units is performed to avoid re-requesting the 3D primitives for the volumetric spatial units that were in the current field-of-view and that remain in the next field-of-view. By determining (at 420) the new volumetric spatial units and any change in the user focus, the client device may preserve the resources to increase fidelity for the new volumetric spatial units and the volumetric spatial units that receive the user focus in the next field-of-view.

Process 400 includes requesting (at 422) the new volumetric spatial units in the next field-of-view and/or volumetric spatial units from the current field-of-view that now receive the user focus in the next field-of-view at different fidelities based on the determined (at 408) available resources and the determined (at 420) change in the user focus. Once again, the client may specify the index for each requested (at 422) volumetric spatial unit and the fidelity desired for that volumetric spatial unit.

Process 400 includes receiving (at 424) the 3D primitives for the new volumetric spatial units and/or additional 3D primitives for increasing fidelity of previously requested volumetric spatial units that receive the user focus in the next field-of-view, and rendering (at 426) the next field-of-view based on the received (at 424) 3D primitives and previously received 3D primitives for the requested volumetric spatial units. In this manner, the client is provided control over the adaptive streaming. Consequently, 3D streaming system 100 may provide a stateless streaming service. Also, with the client controlling which volumetric spatial units are requested at which fidelity, latency and/or delay associated with the client reporting changes to the field-of-view to 3D streaming system 100 are eliminated.

Figure 5:
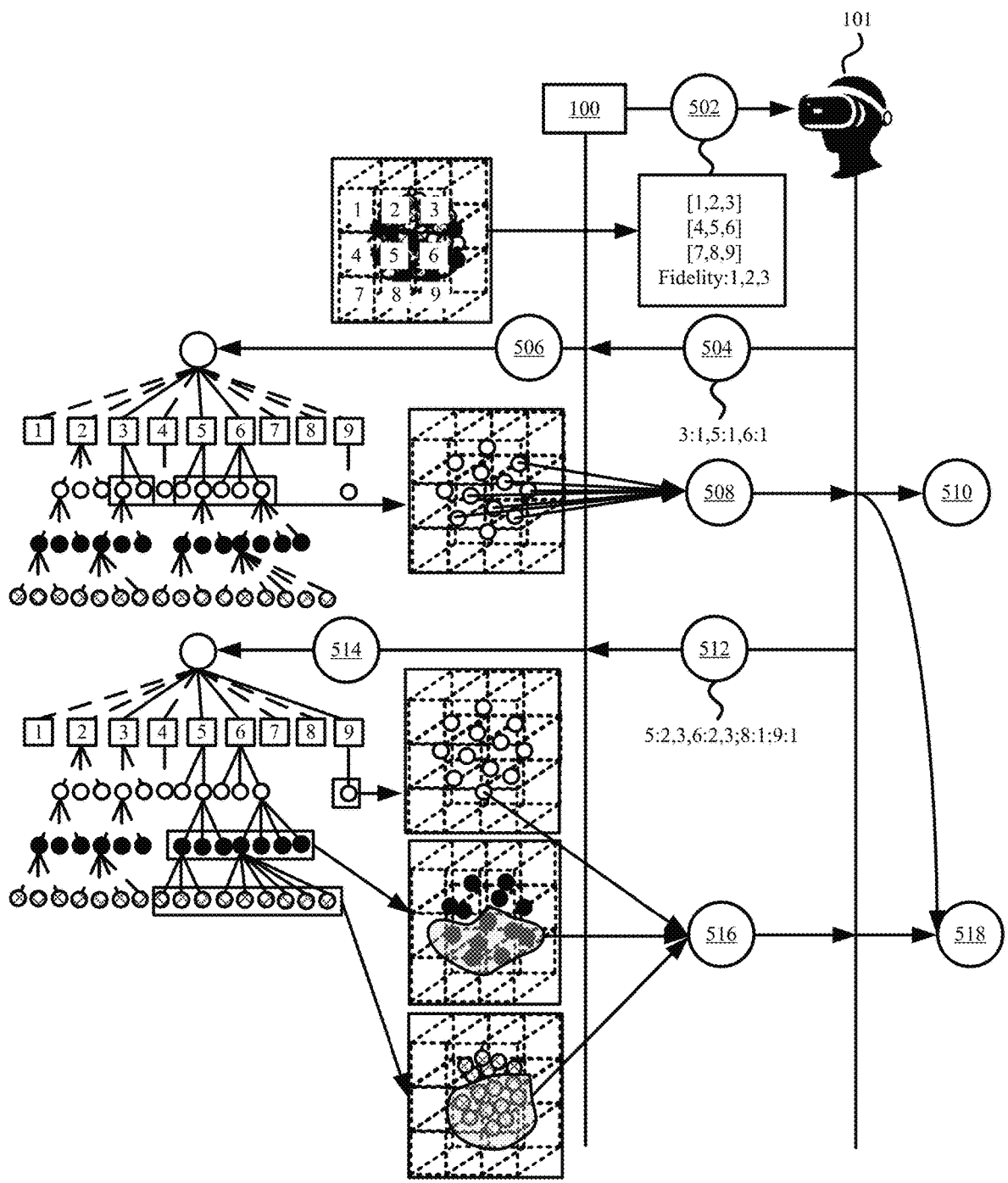
FIG. 5 illustrates an example of the client-controlled adaptive streaming of new 3D primitives for a current field-of-view to combine with previously requested 3D primitives from a last field-of-view that remain in the current field-of-view in accordance with some embodiments presented herein.

FIG. 5 illustrates an example of the client-controlled adaptive streaming of new 3D primitives for a current field-of-view to combine with previously requested 3D primitives from a last field-of-view that remain in the current field-of-view in accordance with some embodiments presented herein. Prior to requesting the last field-of-view, client 101 receives (at 502) the manifest for the different partitioned volumetric spatial units representing the 3D content and the different fidelities at which the 3D primitives are available in each volumetric spatial unit.

For the last field-of-view, client 101 requests (at 504) volumetric spatial units with indices 3, 5, and 6 and a lowest first fidelity from 3D streaming system 100. In response to the request, 3D streaming system 100 traverses (at 506) the branches of the hierarchical representation for the 3D content that are associated with the identified indices down to a first level associated with the requested lowest first fidelity, and presents (at 508) the 3D primitives associated with the traversed nodes of the hierarchical representation to client 101. Client 101 renders (at 510) the last field-of-view based on the presented (at 508) 3D primitives.

Client 101 tracks a change from the last field-of-view to the current field-of-view, determines that the current field-of-view removes the volumetric spatial unit identified with index 3, adds volumetric spatial units identified with index 9, and shifts user focus on the volumetric spatial units identified with indices 5 and 6 so that these volumetric spatial units should be presented at a greater fidelity. Client 101 determines that it has already received the lowest fidelity encoding of 3D primitives for the volumetric spatial units identified with indices 5 and 6 and so requests (at 512) the 3D primitives associated with the second and third fidelities for volumetric spatial units with indices 5 and 6 and the 3D primitives associated with the lowest first fidelity for volumetric spatial unit identified with index 9.

3D streaming system 100 traverses (at 514) the branches of the hierarchical representation based on the fidelities for the identified indices, and presents (at 516) the 3D primitives associated with the traversed nodes of the hierarchical representation to client 101. Client 101 combines the newly received 3D primitives with the previously received 3D primitives for volumetric spatial units identified with indices 5 and 6 to render (at 518) the current field-of-view using the 3D primitives associated with the first, second, and third fidelities for volumetric spatial units identified with indices 5 and 6 and the 3D primitives associated with the first fidelity for volumetric spatial unit identified with index 9.

In some embodiments, client 101 may predict changes to the field-of-view in advance of the changes so as to prefetch the volumetric spatial units at the desired fidelities from 3D streaming system 100. The predictions may be based on continuing a current movement in the 3D space, detecting interesting or prioritized volumetric spatial units coming into the field-of-view, and/or tracked viewing behaviors of other users.

Figure 6:
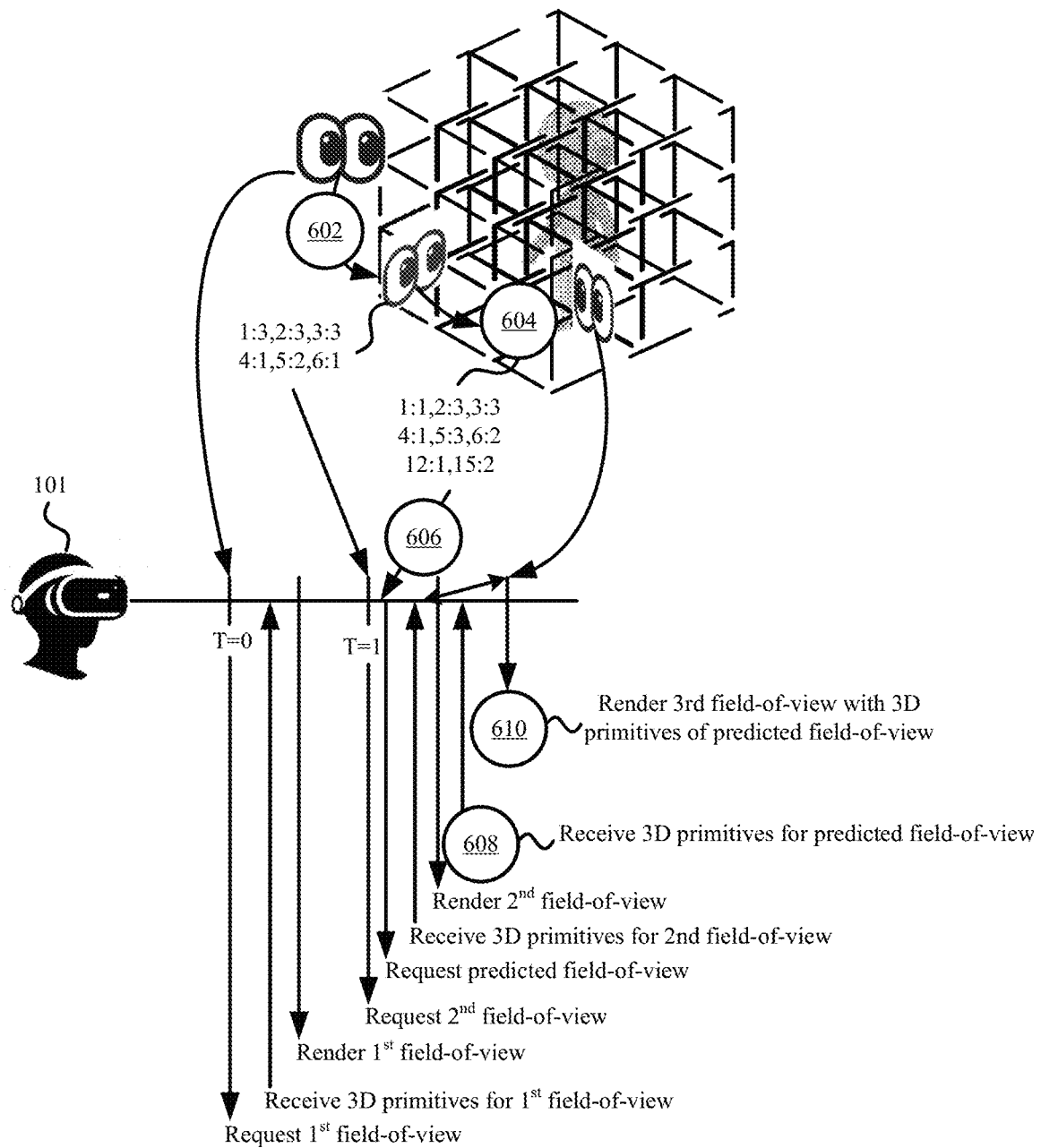
FIG. 6 illustrates an example of the client-controlled adaptive streaming based on predicted user focus in accordance with some embodiments.

FIG. 6 illustrates an example of the client-controlled adaptive streaming based on predicted user focus in accordance with some embodiments. Client 101 tracks (at 602) changes to the user focus to establish the current field-of-view. For instance, client 101 tracks movement of the user gaze via eye tracking sensors, movements of the user head with inertial, rotational, or other sensors, or changes to the user focus based on controller inputs.

Client 101 predicts (at 604) prioritized volumetric spatial units in a next field-of-view based on the tracked (at 602) changes to the user focus. The prioritized volumetric spatial units correspond to the volumetric spatial units that are predicted (at 604) to receive the user focus in the next field-of-view based on the tracked (at 602) changes to the user focus.

Predicting (at 604) the next field-of-view may include continuing with the change in the user focus or the associated movement in order to determine the next volumetric spatial units that are likely to receive the user focus. Predicting (at 604) the next field-of-view may include detecting the features or objects that previously received the user focus and identifying those or similar features or objects in the volumetric spatial units of the current field-of-view or that are just outside the current field-of-view.

Client 101 requests (at 606) the prioritized volumetric spatial units at a fidelity that is predicted based on the continued change of the user focus and that is supported by the available resources prior to the current field-of-view changing to the next field-of-view or the user focus changing from the current field-of-view. Client 101 receives (at 608) the 3D primitives for the prioritized volumetric spatial units at the requested fidelities. Client 101 renders (at 610) the 3D primitives for the prioritized volumetric spatial units immediately in response to the current field-of-view changing to the predicted next field-of-view. In other words, client 101 may render the predicted next field-of-view once the change to the predicted next field-of-view is detected without waiting to submit a request for the 3D primitives in the predicted next field-of-view or receive the 3D primitives.

The client-controlled adaptive streaming may apply to the viewing of static 3D content as well as dynamic or animated 3D content. Dynamic 3D content may include 3D content that changes shape, form, or visual characteristics in response to various events. For instance, 3D characters in a video game may change in response to inputs or interactions with other elements of the video game. Animated 3D content may include 3D content that changes in a predefined manner over time.

To handle dynamic or animated 3D content, the client-controlled adaptive streaming may be modified to include temporal values and/or modified tags. The temporal values may be used to request the changing 3D primitives in a given volumetric spatial unit at a specified fidelity over a period of time. The modified tags may be added to the manifest or sent separate from the manifest and may be used to notify the client of volumetric spatial units that have been updated or have changed 3D primitives.

Figure 7:
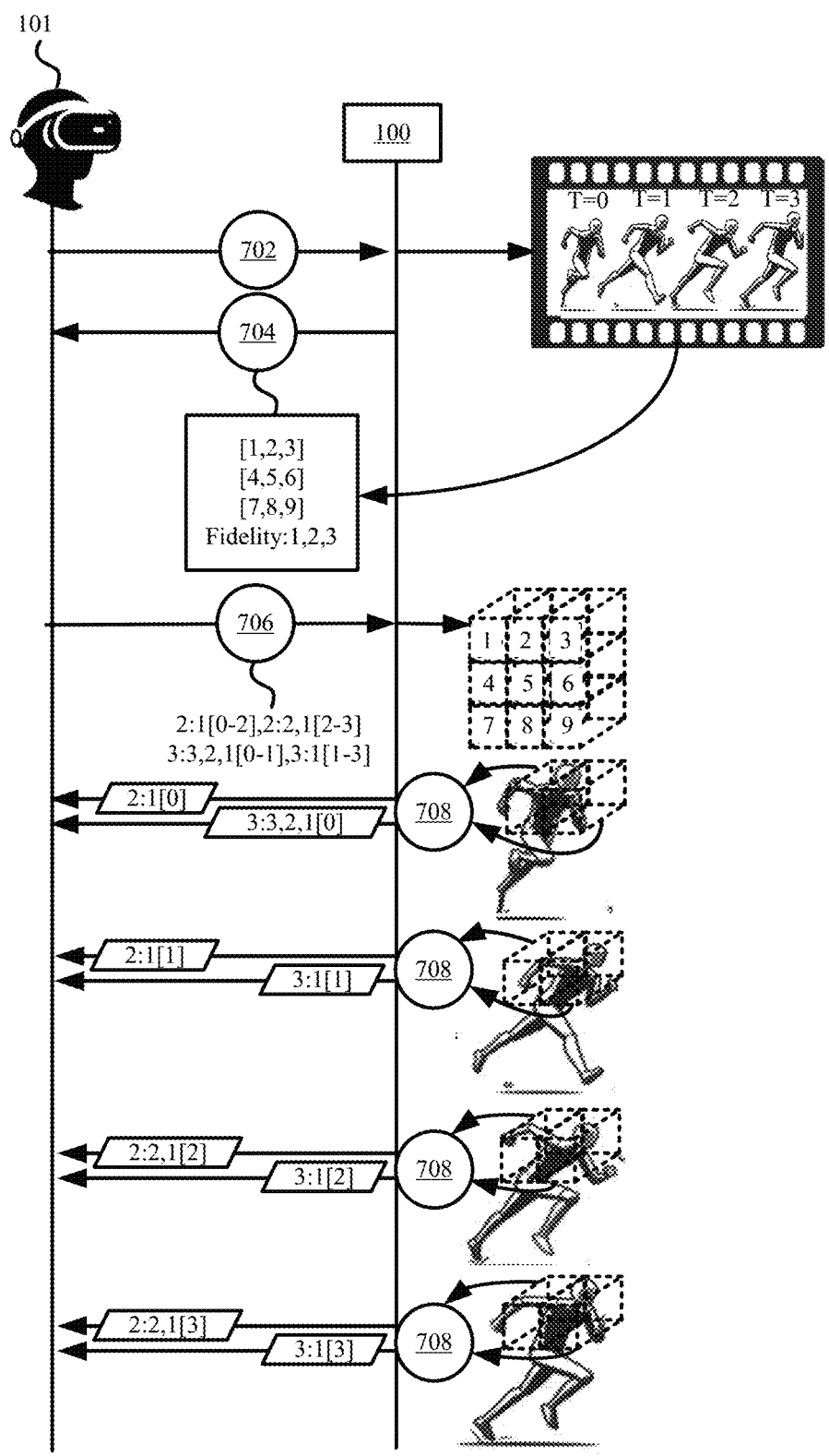
FIG. 7 illustrates an example of the client-controlled adaptive streaming with temporal values in accordance with some embodiments presented herein.

FIG. 7 illustrates an example of the client-controlled adaptive streaming with temporal values in accordance with some embodiments presented herein. Client 101 issues (at 702) a request for 3D content. In this example, the 3D content is dynamic or animated. The dynamic or animated 3D content changes shape, form, and visual characteristics over time based on user input, interactions with other objects in the 3D space, and/or predefined animations for the 3D content.

Client 101 receives (at 704) the manifest for the 3D content. The manifest specifies the partitioning of the 3D content space into indexed volumetric spatial units and the different fidelities at which the 3D primitives in the indexed volumetric spatial units may be requested.

Client 101 requests (at 706) the volumetric spatial units that are in a current field-of-view at one or more different fidelities by specifying the indices for the volumetric spatial units in the current field-of-view and the fidelity value associated with each requested volumetric spatial unit in the request. Client 101 also includes temporal values for the requested (at 706) volumetric spatial units. The temporal values may specify a start time and/or duration for receiving the requested (at 706) volumetric spatial units at the specified fidelity. In some embodiments, client 101 may specify one set of temporal values for all volumetric spatial units specified in the request. In some other embodiments, client 101 may specify temporal values for each volumetric spatial unit. For instance, client 101 may request a first volumetric spatial unit at a first fidelity for a first duration, may request the first volumetric spatial unit at a second fidelity for a second duration after the first duration, may request a second volumetric spatial unit at the second fidelity for a third duration, and may request the second volumetric spatial unit at the first fidelity for a fourth duration that is after the third duration. 3D streaming system 100 streams (at 708) the 3D primitives from the requested volumetric spatial units at the fidelities specified for the corresponding temporal values.

Client 101 may set the temporal values based on an analysis of the requested 3D content and/or an amount of change occurring within one or more analyzed frames. For example, the requested 3D content may include a 3D game with lots of motion in the center or foreground and with static 3D elements in the background. In this example, client 101 may request the volumetric spatial units for the center or foreground with a short duration to allow for rapid fidelity changes due to frequent increases and/or decreases in the number of 3D primitives at the center or foreground. Client 101 may request the volumetric spatial units for the background with a long duration because user focus will not be on the background elements and the background elements include static 3D elements. Similarly, for a predefined 3D animation, client 101 may request the volumetric spatial units with temporal values set according to the 3D animation frame rate, the frequency with which the scenes change, and/or the tracking of the user focus. If the user focus changes frequently between 3D primitives in different volumetric spatial units, client 101 may request those volumetric spatial units with a shorter duration. If the user focus remains fixed at the center of the 3D animation, client 101 may request the volumetric spatial units around the center with a longer duration.

3D streaming system 100 may also notify client 101 when the 3D primitives in a volumetric spatial unit change as these changes may draw the user focus and may be cause for client 101 to request the changing volumetric spatial units at different fidelities. In some embodiments, 3D streaming system 100 may set a flag for each volumetric spatial unit in which the 3D primitives change. The changes may include adding, removing, or repositioning the 3D primitives. The changes may be caused by user inputs, interactions with other objects, and/or predefined animations that affect the 3D primitives in those volumetric spatial units. 3D streaming system 100 may set the flag for a changed volumetric spatial unit in the manifest or may send the flag with the associated volumetric spatial unit index in a separate message to client 101.

Figure 8:
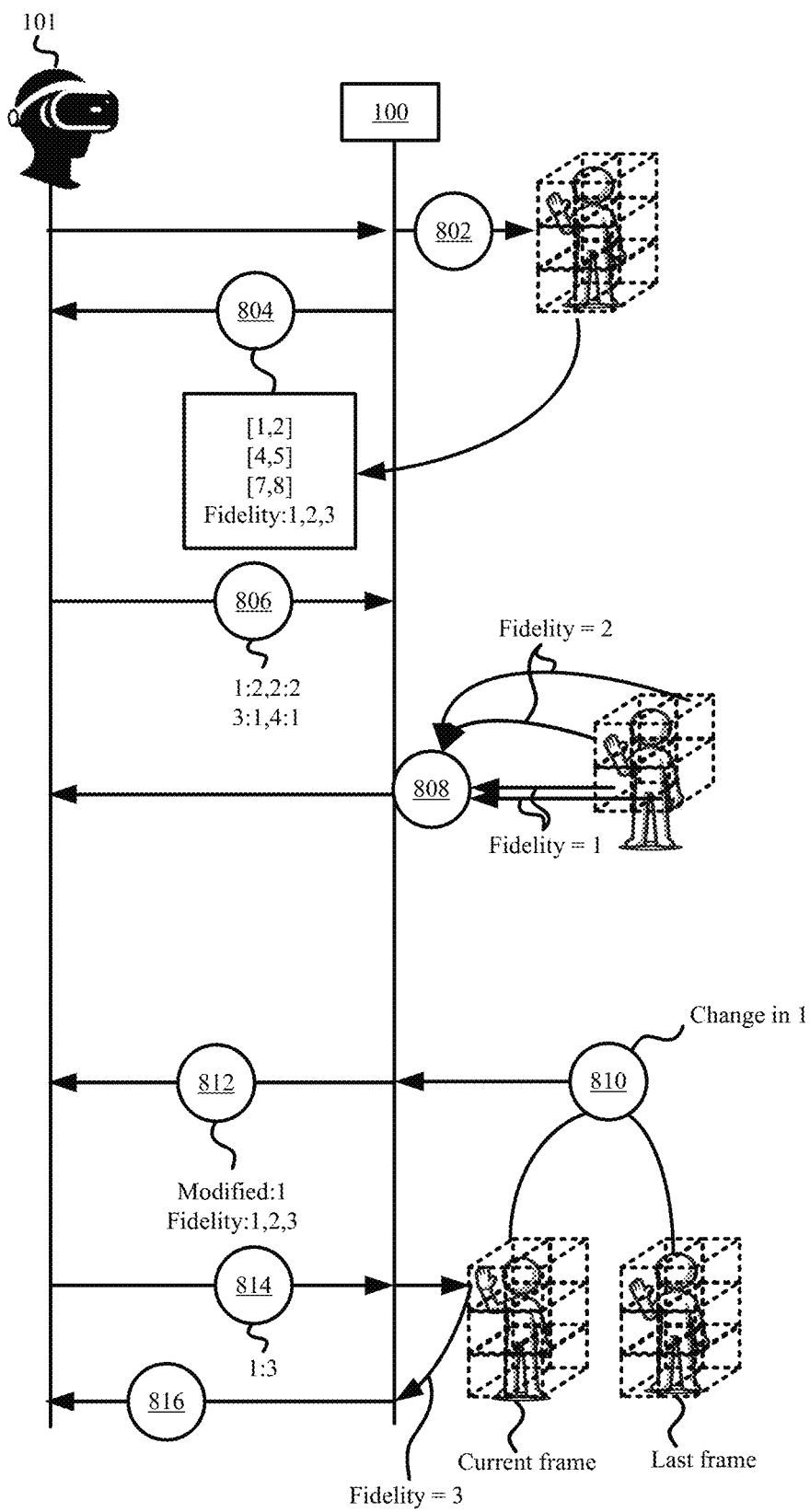
FIG. 8 illustrates an example of the client-controlled dynamic streaming with flagged volumetric spatial units in accordance with some embodiments presented herein.

FIG. 8 illustrates an example of the client-controlled dynamic streaming with flagged volumetric spatial units in accordance with some embodiments presented herein. 3D streaming system 100 generates (at 802) the volumetric spatial units for a 3D animation, and sends (at 804) a manifest with the volumetric spatial unit indices and different fidelities at which the 3D primitives of each volumetric spatial unit are encoded to client 101 in response to client 101 requesting the 3D animation.

Client 101 receives the manifest. Client 101 requests (at 806) the volumetric spatial units for viewing the 3D animation from a particular field-of-view with higher fidelities for the volumetric spatial units receiving the user focus and lower fidelity for the volumetric spatial units that do not receive the user focus. 3D streaming system 100 transmits (at 808) the 3D primitives in the requested volumetric spatial units at the requested fidelities.

3D streaming system 100 compares (at 810) a last frame of the 3D animation to a current frame in order to determine and flag the volumetric spatial units that change between frames. Alternatively, 3D streaming system 100 may generate the 3D animation in response to received user controls or inputs, physics calculation, collisions and/or other interactions between objects in the 3D animation, and/or predefined effects or changes, and may flag the volumetric spatial units that change when generating different frames of the 3D animation. 3D streaming system 100 provides (at 812) the indices for the flagged or changed volumetric spatial units to client 101.

Client 101 may determine that the changes may draw the user focus to the changed volumetric spatial units, and may request (at 814) the changed volumetric spatial units at a different fidelity than in previous requests. In other words, client 101 may request (at 814) the changed volumetric spatial units at a greater fidelity prior to the user focus shifting to the corresponding regions in the presented 3D animation.

3D streaming system 100 streams (at 816) the changed volumetric spatial units at the requested fidelity to client 101. Client 101 updates the visualization of the 3D animation by rendering the 3D primitives that are encoded in the 3D space of the changed volumetric spatial units at the requested fidelity.

Figure 9:
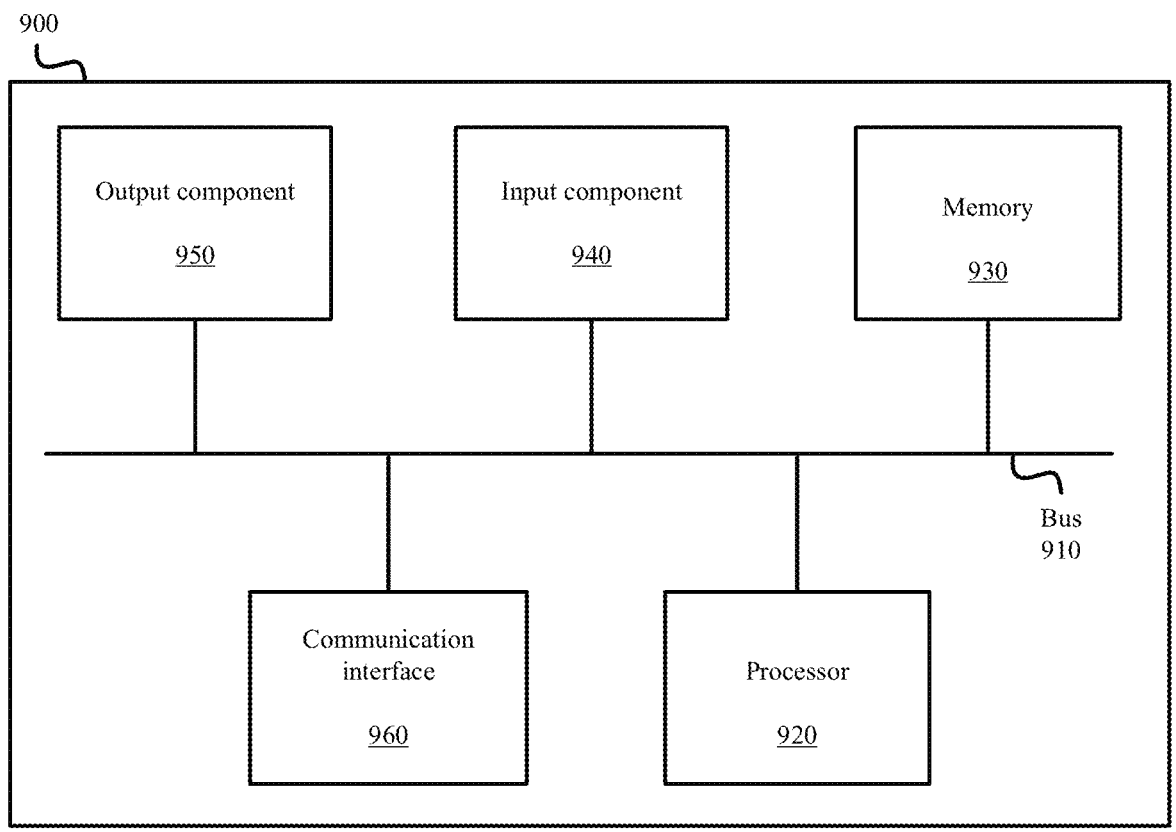
FIG. 9 illustrates example components of one or more devices, according to one or more embodiments described herein.

FIG. 9 is a diagram of example components of device 900. Device 900 may be used to implement one or more of the tools, devices, or systems described above (e.g., 3D streaming system 100, client 101, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
   generating a three-dimensional (3D) model at a plurality of fidelities, wherein the 3D model at a first fidelity of the plurality of fidelities represents a scene or object with a first number of 3D primitives and the 3D model at a second fidelity of the plurality of fidelities represents the scene or object with a second number of 3D primitives;

partitioning the 3D model into a plurality of volumetric spatial units;

generating a manifest comprising an index for each volumetric spatial unit of the plurality of volumetric spatial units and an identifier for each fidelity of the plurality of fidelities; and presenting 3D primitives in a first set of the plurality of volumetric spatial units at a first fidelity and 3D primitives in a second set of the plurality of volumetric spatial units at a second fidelity in response to a request comprising indices of the first set of volumetric spatial units with a first identifier for the first fidelity and indices of the second set of volumetric spatial units with a second identifier for the second fidelity.

2. The method of claim 1 further comprising:
receiving the request; and
providing the manifest in response to the request.

3. The method of claim 1, wherein presenting the 3D primitives comprises:
streaming the first number of 3D primitives that are defined in each of the first set of volumetric spatial units; and
streaming the second number of 3D primitives that are defined in each of the second set of volumetric spatial units.

4. The method of claim 1, wherein presenting the 3D primitives comprises:
representing parts of the 3D model within the first set of volumetric spatial units with a first level-of-detail; and
representing parts of the 3D model within the second set of volumetric spatial units with a second level-of-detail that is greater than the first level-of-detail, and wherein the parts of the 3D model within the second set of volumetric spatial units are represented with more 3D primitives than the parts of the 3D model within the first set of volumetric spatial units.

5. The method of claim 1, wherein partitioning the 3D model comprises:
defining each volumetric spatial unit of the plurality of volumetric spatial units as a non-overlapping region that spans a different volume or part of the 3D model.

6. The method of claim 1, wherein generating the 3D model comprises:
generating the 3D model at the first fidelity with the first number of 3D primitives; and
generating the 3D model at the second fidelity with the second number of 3D primitives added to the first number of 3D primitives.

7. The method of claim 1, wherein generating the 3D model comprises:
associating a first identifier for the first fidelity to the first number of 3D primitives; and
associating a second identifier for the second fidelity to the second number of 3D primitives.

8. The method of claim 1, presenting the 3D primitives comprises:
presenting the 3D primitives in the first set of the plurality of volumetric spatial units that are associated with the first identifier in response to the request; and
presenting the 3D primitives in the second set of the plurality of volumetric spatial units that are associated with the first identifier or the second identifier in response to the request.

9. The method of claim 1, wherein generating the 3D model comprises:
generating a first set of Gaussian splats that represent the scene or object at the first fidelity; and generating a second set of Gaussian splats with a greater density and that are smaller in size than the first set of Gaussian splats to represent the scene or object at the second fidelity.

10. The method of claim 1, wherein generating the 3D model comprises:
generating a first set of Gaussian splats that represent the scene or object at the first fidelity; and
generating a second set of Gaussian splats that are rendered in combination with the first set of Gaussian splats to represent the scene or object at the second fidelity.

11. The method of claim 1 wherein generating the 3D model comprises:
generating a first set of points of a point cloud that represent the scene or object at a first level-of-detail corresponding to the first fidelity; and
generating a second set of points of the point cloud that are rendered in combination with the first set of points to represent the scene or object at a second level-of-detail corresponding to the second fidelity.

12. The method of claim 1 further comprising:
generating a hierarchical representation comprising a first layer of nodes corresponding to the plurality of volumetric spatial units, a second layer of nodes linked to the first layer of nodes that are associated with the first number of 3D primitives representing the 3D model at the first fidelity, and a third layer of nodes linked to the second layer of nodes that are associated with the second number of 3D primitives.

13. The method of claim 12, wherein generating the hierarchical representation comprises:
linking nodes from the second layer of nodes that are associated with 3D primitives at a first fidelity in a specific volumetric spatial unit to a particular node of the first layer of nodes that represents the specific volumetric spatial unit.

14. A three-dimensional (3D) streaming system comprising:
one or more hardware processors configured to:
generate a 3D model at a plurality of fidelities, wherein the 3D model at a first fidelity of the plurality of fidelities represents a scene or object with a first number of 3D primitives and the 3D model at a second fidelity of the plurality of fidelities represents the scene or object with a second number of 3D primitives;
partition the 3D model into a plurality of volumetric spatial units;
generate a manifest comprising an index for each volumetric spatial unit of the plurality of volumetric spatial units and an identifier for each fidelity of the plurality of fidelities; and
present 3D primitives in a first set of the plurality of volumetric spatial units at a first fidelity and 3D primitives in a second set of the plurality of volumetric spatial units at a second fidelity in response to a request comprising indices of the first set of volumetric spatial units with a first identifier for the first fidelity and indices of the second set of volumetric spatial units with a second identifier for the second fidelity.

15. The 3D streaming system of claim 14, wherein the one or more hardware processors are further configured to:
receive the request; and
provide the manifest in response to the request.

16. The 3D streaming system of claim 14, wherein presenting the 3D primitives comprises:
streaming the first number of 3D primitives that are defined in each of the first set of volumetric spatial units; and
streaming the second number of 3D primitives that are defined in each of the second set of volumetric spatial units.

17. The 3D streaming system of claim 14, wherein presenting the 3D primitives comprises:
representing parts of the 3D model within the first set of volumetric spatial units with a first level-of-detail; and
representing parts of the 3D model within the second set of volumetric spatial units with a second level-of-detail that is greater than the first level-of-detail, and wherein the parts of the 3D model within the second set of volumetric spatial units are represented with more 3D primitives than the parts of the 3D model within the first set of volumetric spatial units.

18. The 3D streaming system of claim 14, wherein partitioning the 3D model comprises:
defining each volumetric spatial unit of the plurality of volumetric spatial units as a non-overlapping region that spans a different volume or part of the 3D model.

19. The 3D streaming system of claim 14, wherein generating the 3D model comprises:
generating the 3D model at the first fidelity with the first number of 3D primitives; and
generating the 3D model at the second fidelity with the second number of 3D primitives added to the first number of 3D primitives.

20. A non-transitory computer-readable medium storing instructions that, when executed by one or more processors of a three-dimensional (3D) streaming system, cause the 3D streaming system to perform operations comprising:
generating a three-dimensional (3D) model at a plurality of fidelities, wherein the 3D model at a first fidelity of the plurality of fidelities represents a scene or object with a first number of 3D primitives and the 3D model at a second fidelity of the plurality of fidelities represents the scene or object with a second number of 3D primitives;
partitioning the 3D model into a plurality of volumetric spatial units;
generating a manifest comprising an index for each volumetric spatial unit of the plurality of volumetric spatial units and an identifier for each fidelity of the plurality of fidelities; and
presenting 3D primitives in a first set of the plurality of volumetric spatial units at a first fidelity and 3D primitives in a second set of the plurality of volumetric spatial units at a second fidelity in response to a request comprising indices of the first set of volumetric spatial units with a first identifier for the first fidelity and indices of the second set of volumetric spatial units with a second identifier for the second fidelity.

\* \* \* \* \*